United States Patent
Elias et al.

(10) Patent No.: US 9,630,519 B2
(45) Date of Patent: Apr. 25, 2017

(54) MOTOR VEHICLE WITH ELECTRIC ENERGY ACCUMULATOR AND CHARGING CABLE AS WELL AS METHOD FOR OPERATING A MOTOR VEHICLE

(71) Applicant: Audi AG, Ingolstadt (DE)

(72) Inventors: Björn Elias, Hepberg (DE); Reinhard Peer, Gaimersheim (DE); Achim Enthaler, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 71 days.

(21) Appl. No.: 14/762,152

(22) PCT Filed: Dec. 5, 2013

(86) PCT No.: PCT/EP2013/003677
§ 371 (c)(1),
(2) Date: Jul. 20, 2015

(87) PCT Pub. No.: WO2014/114312
PCT Pub. Date: Jul. 31, 2014

(65) Prior Publication Data
US 2015/0352970 A1   Dec. 10, 2015

(30) Foreign Application Priority Data
Jan. 23, 2013   (DE) ................. 10 2013 001 094

(51) Int. Cl.
*B60L 9/00*   (2006.01)
*B60L 11/18*   (2006.01)
(Continued)

(52) U.S. Cl.
CPC .......... *B60L 11/1838* (2013.01); *B60K 28/10* (2013.01); *B60L 3/00* (2013.01);
(Continued)

(58) Field of Classification Search
CPC .... B60L 11/1838; B60L 3/12; B60L 11/1816; B60L 3/00; B60L 2250/10;
(Continued)

(56) References Cited

U.S. PATENT DOCUMENTS 6,236,911 B1   5/2001 Kruger
6,898,489 B1   5/2005 Hayes, Sr.
(Continued)

FOREIGN PATENT DOCUMENTS

CN   102738873   10/2012
DE   82 13 270.4   5/1982
(Continued)

OTHER PUBLICATIONS

Chinese Search Report issued on May 31, 2016 with respect to counterpart Chinese patent application 201380071113.4.
(Continued)

*Primary Examiner* — Mary Cheung
(74) *Attorney, Agent, or Firm* — Henry M. Feiereisen LLC

(57) ABSTRACT

The invention relates to a motor vehicle (1), comprising an electrical energy storage device (2) chargeable via an external charging device (3), and a charging cable (4) for connecting the motor vehicle (1) to the charging device (3), wherein the motor vehicle (1) further comprises a detection device for wireless detection of the presence of the charging cable (4) in at least one region of the motor vehicle (1) and a control unit (10, 11) communicating with the detection device. The control unit is designed, in particular upon start-up of the motor vehicle (1), to inform a driver and/or to block vehicle operation when the detection result indicates the absence of a charging cable (4).

18 Claims, 1 Drawing Sheet

(51) Int. Cl.
*B60L 3/00* (2006.01)
*B60L 3/12* (2006.01)
*B60W 50/14* (2012.01)
*B60K 28/10* (2006.01)
*B60K 28/00* (2006.01)

(52) U.S. Cl.
CPC .............. *B60L 3/12* (2013.01); *B60L 11/1816* (2013.01); *B60W 50/14* (2013.01); *B60K 2028/003* (2013.01); *B60L 2230/12* (2013.01); *B60L 2240/622* (2013.01); *B60L 2250/10* (2013.01); *B60L 2250/16* (2013.01); *Y02T 10/7005* (2013.01); *Y02T 10/7088* (2013.01); *Y02T 10/7258* (2013.01); *Y02T 10/7291* (2013.01); *Y02T 90/121* (2013.01); *Y02T 90/14* (2013.01); *Y02T 90/16* (2013.01); *Y02T 90/162* (2013.01)

(58) Field of Classification Search
CPC ........... B60L 2250/16; B60L 2240/622; B60L 2230/12; B60K 28/10; B60K 2028/003; B60W 50/14; Y02T 10/7258; Y02T 10/7005; Y02T 90/16; Y02T 90/162; Y02T 10/7088; Y02T 90/14; Y02T 90/121; Y02T 10/7291
See application file for complete search history.

(56) References Cited

U.S. PATENT DOCUMENTS

| | | | |
|---|---|---|---|
| 8,933,663 | B2 | 1/2015 | Elias et al. |
| 8,992,078 | B2 | 3/2015 | Elias et al. |
| 2010/0007306 | A1* | 1/2010 | Fukui ................... B60K 6/445 320/107 |
| 2011/0207347 | A1 | 8/2011 | Tsuruta |
| 2011/0248844 | A1 | 10/2011 | Elias et al. |
| 2012/0098490 | A1* | 4/2012 | Masuda ............... B60L 3/0069 320/109 |
| 2012/0135634 | A1 | 5/2012 | Gaul et al. |
| 2013/0268149 | A1* | 10/2013 | Shimamura .............. B60L 1/00 701/22 |
| 2014/0035565 | A1 | 2/2014 | Enthaler et al. |
| 2014/0097794 | A1 | 4/2014 | Elias et al. |
| 2014/0145423 | A1 | 5/2014 | Isakiewitsch et al. |

FOREIGN PATENT DOCUMENTS

| | | | |
|---|---|---|---|
| DE | 103 44 583 | 5/2005 | |
| DE | 102008052077 | 4/2010 | |
| DE | 102009050756 | 6/2010 | |
| DE | 102009030092 | 12/2010 | |
| DE | 102010014417 | 10/2011 | |
| EP | 2 292 460 | 3/2011 | |
| JP | 2011-160589 | 8/2011 | |
| JP | 2012-228000 | 11/2012 | |
| JP | 2013-102640 | 5/2013 | |
| WO | WO 2010150594 A1 * | 12/2010 | .......... B60L 11/1846 |

OTHER PUBLICATIONS

Translation of Chinese Search Report issued on May 31, 2016 with respect to counterpart Chinese patent application 201380071113.4.
International Search Report issued by the European Patent Office in International Application PCT/EP2013/003677 on Jan. 28, 2014.

* cited by examiner

MOTOR VEHICLE WITH ELECTRIC ENERGY ACCUMULATOR AND CHARGING CABLE AS WELL AS METHOD FOR OPERATING A MOTOR VEHICLE

CROSS-REFERENCES TO RELATED APPLICATIONS

This application is the U.S. National Stage of International Application No. PCT/EP2013/003677, filed Dec. 5, 2013, which designated the United States and has been published as International Publication No. WO 2014/114312 and which claims the priority of German Patent Application, Ser. No. 10 2013 001 094.2, filed Jan. 23, 2013, pursuant to 35 U.S.C. 119(a)-(d).

BACKGROUND OF THE INVENTION

The invention relates to a motor vehicle, including an electric energy accumulator, in particular a battery, which can be charged via an external charging device, and a charging cable for connecting the vehicle to the charging device. In addition, the invention relates to a method for operating such a motor vehicle.

In the art, motor vehicles are already known which receive part of their driving power from an electric energy accumulator. The electric energy accumulator is hereby predominantly configured as a high-voltage battery having a higher voltage than the typical on-board electrical system. In electric motor vehicles and so-called plug-in hybrids, it is possible to recharge the energy accumulator by a charging device from an external power source. To connect the charging device and a corresponding plug-in location on the motor vehicle, it is known to provide a charging cable that is associated with the motor vehicle itself. This means that the motor vehicle, for example an electric motor vehicle, and not the infrastructure is typically delivered with the charging cable. The charging cable can, depending on the exact specification of the charging method, be designed for example in such a way that it can be plugged in at both ends. One side is thus plugged into the vehicle, the other side to the charging device (charging infrastructure). Once this is done, charging starts.

As soon as charging is completed, the charging cable can be released on both sides again, wherein known designs require release of at least the vehicle-side plug again, as otherwise vehicle operation of the motor vehicle is prevented, for example, by blocking the drive train of the motor vehicle. A released charging cable can be stowed for example within the motor vehicle at a designated position.

However, it is also conceivable that a driver, when starting to drive off, releases the charging cable only on the vehicle side, for example for reasons of convenience. Now, the motor vehicle can be moved, without carrying the charging cable with it. In such a case, the charging cable remains at the charging site. This can happen, however, also inadvertently, when the driver leaves behind/leaves hanging the charging cable and drives off without the charging cable.

In such cases, the driver no longer has available a charging cable at the destination site. He can therefore no longer charge the motor vehicle, that is the energy accumulator. When an electric vehicle is involved, this may lead to a so-called "stranded vehicle".

However, there are also situations conceivable in which the driver deliberately drives off without the charging cable, for example, when planning a round trip (departure point same as destination point), in the absence of stowage space for the charging cable because of the cargo in the motor vehicle, or when being sure that the driving distance is short enough so that the energy is sufficient to return. Also, the presence of an emergency situation can cause a driver to drive off without the time-consuming stowage of the charging cable.

SUMMARY OF THE INVENTION

The invention is therefore based on the object to provide a possibility to assist the driver in the management of the charging cable.

This object is attained in a motor vehicle of the type as mentioned above by further providing the motor vehicle in accordance with the invention with a detection device for wireless determination of a presence of the charging cable in at least one area of the motor vehicle, and a control unit communicating with the detection device and configured, in particular when starting the motor vehicle, to inform a driver and/or to block vehicle operation, when a determination result indicates the absence of a charging cable.

It is therefore proposed to detect whether the charging cable is located in the interior of the motor vehicle, specifically at least in an area of the interior of the vehicle. For this purpose, a detection device is provided which detects the presence of the charging cable in the interior of the vehicle (or at least in the area of the interior) and makes it available as determination result. A control unit which is connected, for example, via a vehicle bus with the detection device, analyzes the determination result and can inform the driver and/or block the vehicle operation, at least temporarily, when the charging cable is not present inside the motor vehicle. The detection of the charging cable and the resultant measures are preferably executed when starting the motor vehicle, for example when the driver thus intends to just about drive off. It should be noted that corresponding functionalities can be implemented within the scope of the present invention also by more than one control unit inside the motor vehicle.

There is first the possibility to inform the driver, for example, by issuing a warning, which can be realized optically and/or haptically and/or acoustically. For example, it is possible, to issue a message to inform the driver via a combination display and/or on the instrument panel, wherein similar procedures like an indication of a low fuel level or warning that an occupant has not yet buckled up can be used. For example, a warning light, accompanied by an acoustic signal, can be activated when the driver starts to operate the motor vehicle, even though the charging cable is not present in the interior of the vehicle. In general terms, the motor vehicle can thus have at least one output device for optical and/or acoustic and/or haptic output of a message for informing the driver.

This ensures that the driver is informed at all times that the charging cable is not present in the vehicle (or at least in the area, preferably an area that is anyway intended for stowage of the charging cable). In this way, it is no longer possible that the driver accidentally forgets the charging cable. A stranding can be avoided in this way.

In addition or as an alternative, provision may be made to block vehicle operation in the absence of a charging cable in the interior or at least the area of the motor vehicle so as to prevent, at least for the time being, the driver from driving off without the charging cable. This provides a further information and indication which is absolutely unambiguous. In order to also satisfy the wishes of the driver to be able to start driving in certain situations without the charging cable, it is particularly advantageous when providing an unlocking device to liberate vehicle operation after a blockage in accordance with a defined driver-side control action. This means that the blockage of the vehicle operation can be released again by a predefined and intuitive control action of the driver so as to still afford the driver the option to begin a trip without the charging cable. For example, a dedicated operating element may be provided to release the blockage, but it is also possible to actuate a specific sequence of operating elements that are present anyway in order to clear the motor vehicle for vehicle operation. The driver is then aware in any case that the trip now contemplated will be carried out without the charging cable.

According to a refinement of the invention, provision can be made for the detection device to include at least one receiving apparatus for signals of a charging-cable-side transmitting apparatus, and the charging-cable-side transmitting apparatus. The charging cable is thus equipped with a transmitting apparatus which sends out a signal. This signal can be picked up by a receiving apparatus, which is provided in particular in the interior of the motor vehicle, and can be evaluated as to whether the charging cable is located in the interior of the motor vehicle or at least the area in the interior of the motor vehicle. The transmitting apparatus and the receiving apparatus can hereby include each an antenna and a control unit, which determines how signals are sent or received.

It should hereby be noted that the detection device may also include several receiving devices, wherein a signal strength and/or time of reception of a signal that has been received from the transmitting device allows determination of a location information of the charging cable, preferably, a presence of the charging cable inside and/or outside the motor vehicle. In this case, several receiving devices are dispersed in particular in the interior of the motor vehicle and allow decision, preferably based on the received signal strength, which receiving device is closest to the transmitting device and/or whether the charging cable is located in the interior of the motor vehicle (as covered by the receiving apparatuses).

It should be noted at this point that the charging-cable-side hardware, i.e. the transmitting device, including in particular the antenna and electronic components, can be designed very small. This results as a limitation in a range reduction, which can be offset by the presence of several receiving apparatuses and/or provided desired storage sites for the charging cable. In the latter case, the detection device would then especially cover only one or more areas of the interior of the motor vehicle.

It is also useful, when the transmitting apparatus includes a receiving unit for request signals of the detection device and/or for energy for the transmitting apparatus. In particular, the transmitting apparatus can be designed as a RFID tag. It is thus possible, on one hand, in particular to save energy, to operate the transmitting device in the charging cable only when a corresponding request signal, for example when starting the motor vehicle, has been received from the detection device, sent, for example via a transmitting unit of the receiving apparatuses, or also via a dedicated, stand-alone transmitting unit. In response, the transmitting apparatus of the charging cable transmits the signal, which may include a general identification information that identifies the transmitter as the charging cable. It is, however, also useful, when the receiving unit, in particular additionally or as request signal, is able to receive power for operating the transmitting apparatus, as this is basically already known from the RFID technology. A corresponding transmitting unit of the detection device then transmits at a certain frequency which is received by the receiving unit and converted into operating power for transmission by the transmitting apparatus.

Preferably, the transmitting device is integrated in a structural unit having at least a further device for realizing functions of the charging cable, in particular communication and/or safety functions. For certain charging methods, it is known to also realize various functions within the charging cable, for example a communication with a motor-vehicle-side control device that attends to the charging process, or also safety measures that can protect the motor vehicle and/or the charging device. This is known in particular in charging methods in which the motor vehicle can be connected by the charging cable directly to a standard wall outlet as charging device, wherein ultimately the intelligence known from the so-called "wall boxes" can then be realized completely in the charging cable. The corresponding components, in particular electronic components, are then typically accommodated in a common structural unit, which can be referred to as "in-cable-device". Such a structural unit can then preferably accommodate also the transmitting apparatus so as to establish an extremely compact, integrated design.

According to a particularly advantageous configuration of the present invention, provision can be made for the motor vehicle to further include a navigation system having a destination memory and being configured to save an actual position of the motor vehicle as a memory entry indicating a position of the charging cable, when the determination result indicates the absence of the charging cable and during a most recent operation of the motor vehicle the determination result indicates the presence of the charging cable. Navigation systems in motor vehicles are generally known in the art and enable through instructions to the driver to guide the driver on an optimum route to a destination site, wherein various destination sites can also be stored as memory entries. The idea of the design described herein is now to save the position of the startup of the motor vehicle, when the driver leaves the charging cable outside the motor vehicle when driving off, so that even when the charging cable has not been taken along during travel of the motor vehicle, it is stored in the navigation system and thus known, where the charging cable is located. A prerequisite for this storage process is the presence of the charging cable during the last operation, thus has been left behind at the current location, a fact that is checked accordingly. In particular, the memory entry, indicating the position of the charging cable, may also be utilized to conveniently enable a return to the charging cable. The navigation system is thus able to indicate the way to the charging cable. In particular, this may be appropriate in a case in which another driver wants to find the way back to the charging cable.

According to a refinement of this idea, the navigation system can be configured for designation of the memory entry as memory entry indicating the position of the charging cable and a charging device when a charging process is involved which precedes an actual startup of the motor vehicle without further operation of the motor vehicle, otherwise configured for designation of the memory entry as memory entry solely for indication of the position of the charging cable. Two different scenarios can thus be distinguished. When the energy accumulator has not been charged between the situation, when the charging cable is in the motor vehicle, and the situation when the charging cable is no longer in the motor vehicle, it is not known whether a charging device is located at the current position of the charging cable. Accordingly, the memory entry in the navigation system can be referred to, for example, as "position of the charging cable". When, however, a charging procedure has been carried out between the detected presence of the charging cable in the motor vehicle and the detected absence of the charging cable in the motor vehicle, it is known that a charging device is also located there. Accordingly, the memory entry in the navigation system can then be referred to, for example, as "position of the charging device with charging cable". Thus, additional information is also automatically determined and stored to assist the driver.

According to a further useful configuration of the subject matter of the present invention, it is provided that the detection device is further configured to determine the presence of at least one further item which can be removed and stowed in the motor vehicle in at least one area of the motor vehicle, wherein the control unit is configured to inform a driver and/or block vehicle operation in the presence of a determination result indicating the absence of the item. Such a further item can be, for example, a safety vest and/or a first aid kit and/or a warning triangle and/or a driver's license. It is therefore suggested to render also other items, necessary for a trip or even legally required, detectable, for example by providing a respective transmitting apparatus. Examples of such items include the safety vest, the first aid kit and the warning triangle. The motor vehicle is also capable to check the presence of at least a driver's license in the interior of the vehicle so long each driver's license is equipped with respective means, in particular the transmitting apparatus. In this way, the functionality of the system proposed herein to assist the driver can also be expanded to other important items in the motor vehicle.

In addition to the motor vehicle, the present invention also relates to a method for operating a motor vehicle, including an energy accumulator which can be charged via an external charging device, and a charging cable for connecting the motor vehicle to the charging device, which is characterized in that a presence of the charging cable in at least an area of the motor vehicle is determined via a detection device, wherein in particular when starting the motor vehicle, a driver is informed and/or vehicle operation is blocked, when a determination result indicates the absence of the charging cable. All configurations of the motor vehicle can be applied in analogous manner to the method according to the invention, so that the same advantages can be obtained as with the motor vehicle according to the invention.

In particular, the method according to the invention renders possible, when detecting an absence of the charging cable in the interior of the vehicle, to make a memory entry in the navigation system, which reflects the current position of the charging cable. In this case, as described above, it is possible to automatically distinguish between different scenarios.

BRIEF DESCRIPTION OF THE DRAWING

Further advantages and details of the present invention will become apparent from the exemplary embodiments described hereinafter and with reference to the drawing. It is shown in.

DETAILED DESCRIPTION OF PREFERRED EMBODIMENTS

Figure 1:
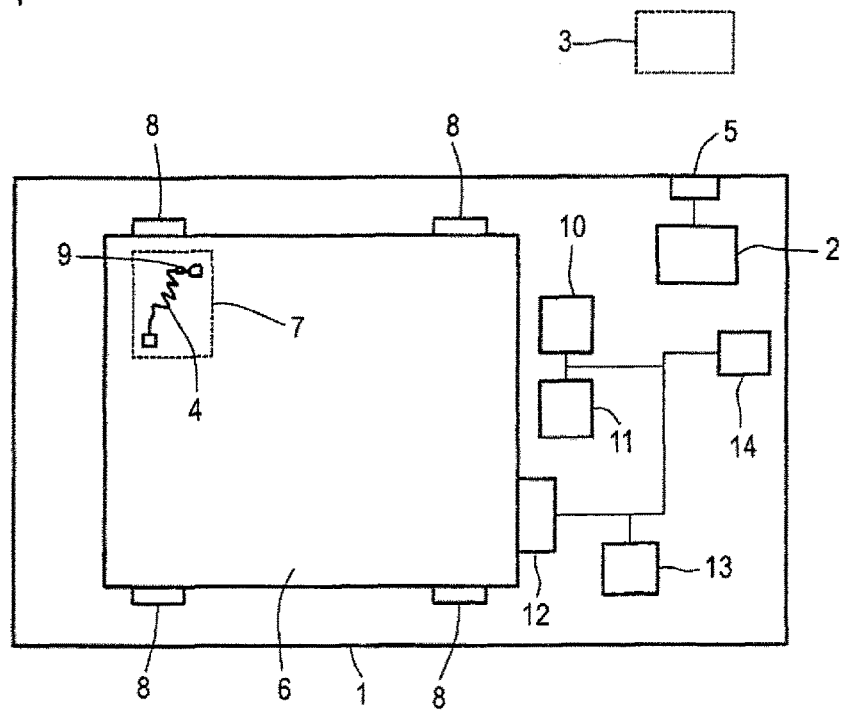
FIG. 1 a motor vehicle according to the invention.

FIG. 1 shows a basic illustration of a motor vehicle 1 according to the invention. It involves an electric vehicle, which means that the driving power for the motor vehicle 1 is made available by an electric energy accumulator 2 which is connected to the engine not shown here in greater detail. The electric energy accumulator 2, in particular a high-voltage battery, can be charged by a charging device 3 which is only hinted here and is not part of the motor vehicle 1. For this purpose, the motor vehicle 1 has a charging cable 4, which can establish a connection between the charging device 3 and the motor vehicle 1 via an appropriate plug-in location 5 and an appropriate charging-device-side plug-in location, not shown here in greater detail, so that the energy accumulator 2 can be charged.

The charging cable 4 can be stored in an interior 6 of the motor vehicle 1, for example, in a specifically designated stowage space 7 for that purpose.

In the motor vehicle 1, the presence of the charging cable 4 can be determined in the interior 6 of the motor vehicle 1, for which purpose provision is made for a detection device. The latter includes here several receiving apparatuses 8 which are capable to receive the signals of a charging-cable-side transmitting apparatus 9, shown only schematically, of the charging cable 4. The receiving apparatuses 8, which like the transmitting apparatus 9 are not shown in greater detail for ease of illustration, include an antenna and a control unit comprised of electronic components, connected to a control unit 10 which can analyze received signals. The signal strength is checked here at the various receiving apparatuses 8 to ascertain whether the charging cable 4 is, in fact, located in the interior 6 of the motor vehicle 1. It should be noted hereby that in other configurations it is also possible to estimate a more accurate position of the charging cable 4 in the motor vehicle 1 as a result of the signal strengths.

A corresponding determination result in the control unit 10 indicates hereby, whether or not the charging cable 4 is located in the interior 6 of the motor vehicle 1.

The determination result is transmitted from the control unit 10 of the detection device to a further control unit 11 via a vehicle bus, wherein it is also conceivable within the scope of the present invention that the evaluation of the determination result is established in the control unit 10 itself.

In the present exemplary embodiment, it is now provided that the determination result is always determined when the vehicle 1 should be started. When then determining that the charging cable 4 is not located in the interior 6 of the motor vehicle 1, several measures are being taken. On one hand, an output device 12 is activated to output a message to inform the driver about the absence of the charging cable 4, which will be discussed in more detail hereinafter. Further, it is provided that vehicle operation of the motor vehicle 1 is initially blocked. The driver, who has been accordingly informed by the output device 12, has however the option to implement a defined operating action so that an unlocking device 13 liberates the vehicle operation again and thereby still enable a trip without the charging cable 4. For this purpose, suitable dedicated control elements can be provided, but it is also conceivable, to utilize operating elements that are anyway present, in particular in a specific sequence.

Finally, the motor vehicle 1 also includes a navigation system 14. A memory entry is always generated in the navigation system, once a travel without the charging cable has started, and when the charging cable was still present during the last trip in the motor vehicle 1, to describe the current position as the position of the charging cable 4. Specifically, the memory entry is then designated only as "position of the charging cable", when no charging has occurred between a presence of the charging cable 4 in the motor vehicle 1 and an absence of the charging cable 4 in the motor vehicle 1. In the event, charging has occurred between these situations, the designation is "position of the charging device with charging cable". Using the memory entry in the navigation system 14 enables the driver or another driver to return at all times back to the charging cable 4, and, optionally, the charging device 3.

Figure 2:
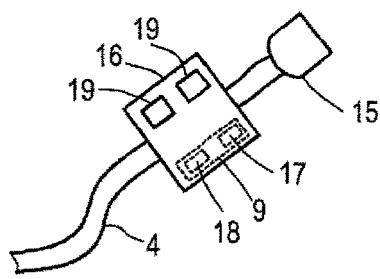
FIG. 2 a charging cable of the motor vehicle according to the invention.

FIG. 2 shows in more detail an end of the charging cable 4 having a plug 15 and a structural unit 16. In addition to the transmitting unit 9 including the antenna 18 and the control unit 17, further devices 19 are integrated in the structural unit 16 which realize other functionalities, here communication and safety functions, of the charging cable 4.

The antenna 18 together with the control unit 17 may also serve as a receiving unit for request signals of the detection device as well as power for the transmitting process. When starting the motor vehicle 1, the detection device sends via appropriate transmitting units, which are not shown in greater detail and may be realized, for example, in the receiving apparatuses 8, request signals of a certain frequency which are received by the antenna 18 and serve, on one hand, as request signal and, on the other hand, as energy. The transmitting apparatus 9 then sends via the antenna 18 a signal which permits identification of the charging cable 4 as such. This signal, in turn, is received by the receiving apparatuses 8 and, as described above, analyzed by the control unit 10 for determining the determination result.

It should be noted that the transmitting apparatus 9 can also be realized as RFID tag.

Figure 3:
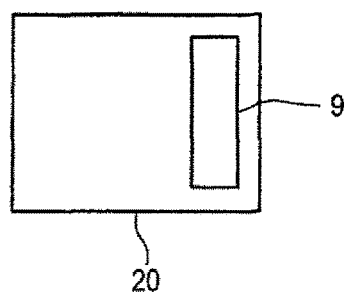
FIG. 3 a further item.

After providing the possibility to detect the charging cable 4, the detection device is also used to detect further items that are necessary or required by law for operation of the motor vehicle 1. FIG. 3 shows a basic illustration of such a further item 20, which, as is readily apparent, also includes a transmitting device 9'. The item 20 may, for example, involve a safety vest, a first aid kit, a warning triangle or a driver's license. In the absence of the item 20 in the interior 6 of the motor vehicle 1, corresponding measures can be taken as described above with respect to the charging cable.

Figure 4:
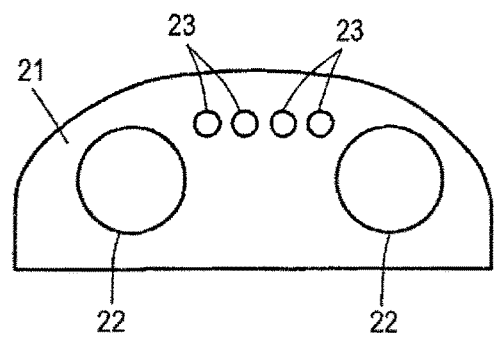
FIG. 4 a possible indication of an absence of the charging cable.

FIG. 4 shows a possibility for optical output of a message to inform the driver about the absence of the charging cable 4. An instrument panel 21 of the motor vehicle 1 is shown and includes in addition to pointer instruments 22 also status lights 23 which may indicate, for example, a low energy state, the status of occupant restraint systems and the like. One of these status lights 23 is associated also to the charging cable 4 and lights up, accompanied by an additional acoustic signal, when determining an absence of the charging cable 4 in the motor vehicle 1.

What is claimed is:

1. A motor vehicle, comprising:
   an electric energy accumulator adapted for charging via an external charging device;
   a charging cable adapted for connection of the motor vehicle with the charging device;
   a detection device configured for wireless determination of a presence of the charging cable in at least one area of the motor vehicle;
   a control unit communicating with the detection device and configured to inform a driver and/or to block vehicle operation, when a determination result indicates an absence of the charging cable; and
   an unlocking device rendered operational for freeing the vehicle operation, following a blockage, in accordance with a defined driver-side control action.

2. The motor vehicle of claim 1, wherein the control unit is rendered operational, when starting the motor vehicle.

3. The motor vehicle of claim 1, wherein the charging cable includes a transmitting apparatus, said detection device comprising at least one receiving apparatus for receiving a signal from the transmitting apparatus.

4. The motor vehicle of claim 3, wherein the transmitting apparatus comprises a receiving unit for request signals of the detection device and/or for energy for the transmitting apparatus.

5. The motor vehicle of claim 3, wherein the transmitting apparatus is configured as a RFID tag.

6. The motor vehicle of claim 3, further comprising a structural unit which includes at least one further device for realizing functions of the charging cable, said transmitting apparatus being integrated in the structural unit.

7. The motor vehicle of claim 6, wherein the further device is configured for realizing communication and/or safety functions.

8. The motor vehicle of claim 1, further comprising at least one output device for optical and/or acoustic and/or haptic output of a message to inform the driver about the absence of the charging cable.

9. The motor vehicle of claim 1, further comprising a navigation system having a destination memory and being configured to save an actual position of the motor vehicle as a memory entry indicating a position of the charging cable, when the determination result indicates the absence of the charging cable and during a most recent operation of the motor vehicle the determination result indicates the presence of the charging cable.

10. The motor vehicle of claim 9, wherein the navigation system is configured for designation of the memory entry in one of two ways, a first way in which the memory entry indicates the position of the charging cable and the charging device, when a charging process is involved which precedes an actual startup of the motor vehicle without further operation of the motor vehicle, a second way in which the memory entry indicates solely the position of the charging cable.

11. The motor vehicle of claim 1, wherein the detection device is configured to determine a presence of at least one further item which is removably stowable in the motor vehicle in at least one area of the motor vehicle, said control unit being configured to inform the driver and/or to block the vehicle operation, when a determination result indicates an absence of the item.

12. The motor vehicle of claim 11, wherein the further item is a safety vest and/or a first aid kit and/or a warning triangle and/or a driver's license.

13. A method for operating a motor vehicle, comprising:
   determining by a detection device whether a charging cable, adapted for connecting an electric energy accumulator with an external charging device, is present in at least one area of the motor vehicle;
   informing a driver and/or blocking vehicle operation, when a determination result by the detection device indicates an absence of the charging cable; and
   freeing the vehicle operation, after being blocked as a consequence of the absence of the charging cable, through active intervention by the driver.

14. The method of claim 13, wherein the detection device is rendered operational, when starting the motor vehicle.

15. The method of claim 13, further comprising issuing a warning to the driver, when the determination result indicates the absence of the charging cable.

16. The method of claim 15, wherein the warning is realized optically and/or haptically and/or acoustically.

17. The method of claim 13, further comprising saving an actual position of the motor vehicle by a navigation system as a memory entry indicating a position of the charging cable, when the determination result indicates the absence of the charging cable and during a most recent operation of the motor vehicle the determination result indicates the presence of the charging cable.

18. The method of claim 17, further comprising designating the memory entry in one of two ways, a first way in which the memory entry indicates the position of the charging cable and the charging device, when a charging process is involved which precedes an actual startup of the motor vehicle without further operation of the motor vehicle, a second way in which the memory entry indicates solely the position of the charging cable.

* * * * *